(12) United States Patent
Eckert et al.

(10) Patent No.: US 7,445,576 B2
(45) Date of Patent: Nov. 4, 2008

(54) PLANETARY GEAR

(75) Inventors: Harald Eckert, Meckenbeuren (DE); Ulrich Kuchelmeister, Friedrichshafen (DE); Eckhard Förster, Bermatingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/576,443

(22) PCT Filed: Sep. 29, 2004

(86) PCT No.: PCT/EP2004/010883

§ 371 (c)(1),
(2), (4) Date: May 19, 2006

(87) PCT Pub. No.: WO2005/050061

PCT Pub. Date: Jun. 2, 2005

(65) Prior Publication Data

US 2007/0099744 A1    May 3, 2007

(30) Foreign Application Priority Data

| Oct. 21, 2003 | (DE) | ................................ 103 48 755 |
| Oct. 21, 2003 | (DE) | ................................ 103 48 757 |
| Jan. 24, 2004 | (DE) | ....................... 10 2004 003 684 |
| Jan. 24, 2004 | (DE) | ....................... 10 2004 003 685 |

(51) Int. Cl.
*F16H 3/44* (2006.01)

(52) U.S. Cl. ........................ 475/320; 475/303

(58) Field of Classification Search ................ 475/269, 475/317, 320, 303, 296
See application file for complete search history.

(56) References Cited

U.S. PATENT DOCUMENTS

| 2,933,944 | A | | 4/1960 | Carnagua |
| 4,063,470 | A | * | 12/1977 | Kelbel ......................... 475/320 |
| 4,667,538 | A | * | 5/1987 | Larsson ....................... 475/299 |
| 4,976,671 | A | | 12/1990 | Andersson |
| 5,390,347 | A | | 2/1995 | Buri et al. |
| 6,196,944 | B1 | | 3/2001 | Schmitz |
| 6,605,019 | B1 | | 8/2003 | Eckert |

FOREIGN PATENT DOCUMENTS

| DE | 1 008 078 | | 5/1957 |
| DE | 1 775 827 | | 9/1971 |
| DE | 199 17 673 A1 | | 10/2000 |
| EP | 0423863 A1 | * | 4/1991 |

* cited by examiner

*Primary Examiner*—Roger Pang
(74) *Attorney, Agent, or Firm*—Davis Bujold & Daniels, P.L.L.C.

(57) ABSTRACT

A planetary transmission, in particular for machine tools, with a drive shaft that is connected to a sun gear, with an output shaft that is connected to a planetary carrier and with an interior gear, that in a first operating position engages with the housing, and in the second operating position engages with the sun gear, with a hub that surrounds the drive shaft concentrically and with a sliding collar that surrounds the hub concentrically and that engages with the hub in an operating position. The sliding collar (5) engages in the loose end of the interior gear (4) with a centering diameter (7) concentrically located with the hub (6), which in the engaged position of the sliding collar (5) engages with the hub (6) in a concentric position with the hub's axle on its centering collar (8).

9 Claims, 1 Drawing Sheet

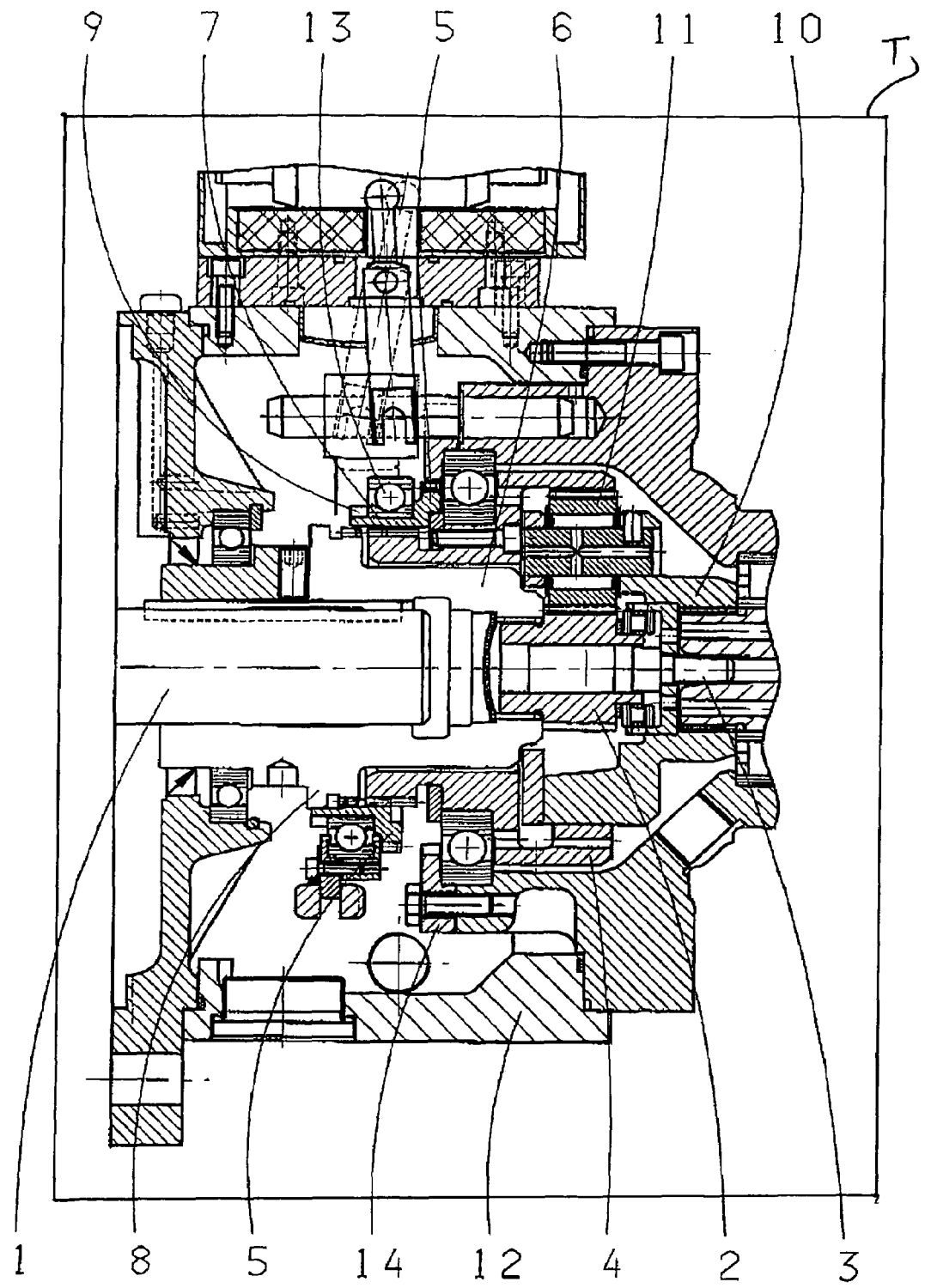

PLANETARY GEAR

This application is a national stage completion of PCT/EP2004/010883 filed Sep. 29, 2004 which claims priority from German Applications Serial Nos. 10 2004 003 685.3 filed Jan. 24, 2004, 10 2004 003 684.5 filed Jan. 24, 2004, 103 48 757.3 filed Oct. 21, 2003 and 103 48 755.7 filed Oct. 21, 2003.

FIELD OF THE INVENTION

The present invention refers to a planetary transmission, in particular for machine tools.

BACKGROUND OF THE INVENTION

This planetary transmission, mostly built as a single- or multiple-stage planetary transmission, is basically implemented in machine tools, as well as in lathes, milling machines and machining centers. The selectable planetary transmission increases the service scope of the main spindle motors, as well as the flexibility of the machine tool for processing the different work materials through increasing high torques or high speeds. For example, two transmission stages may be built in, while on one hand the drive shaft which is connected to a sun gear with an internal gear and on the other the internal gear can be coupled to the housing. A planetary carrier is connected to the output shaft.

In DE A 199 17 673 of the applicant, there is such a two-stage planetary transmission, with a drive shaft and an output shaft which are mounted in the housing over roller bearings. The drive shaft is connected to a sun gear which engages with the planetary gears which are mounted over bearings on planetary bolts in a planetary carrier, which is connected over a positive fit connection with the output shaft. The planetary gears mesh with an internal gear, which is mounted over the roller bearings in the housing or in the rotating planetary carrier and positively fit with a hub connection. The hub is connected in a slip free manner, over an external gearing, with the first part of the sliding collar.

A roller bearing is located over the sliding collar. The external part is axially displaceable in the housing, running over bearing bolts, whereby the axial displacement of the external part is carried over the roller bearings.

The sliding collar can be placed in three operating positions and one neutral position. In the first operating position, the internal gear is coupled with the housing by a turret gearing. In the second operating position, the internal gear is coupled with the sun gear by a turret with a synchronizing gear and a positive locking connection. The turret is thereby connected in a slip free manner with the drive shaft.

The sliding collar displacement takes place through a switching mechanism, whose actuator is an electromagnet or a motorized switching unit and whose armature is connected with the sliding collar by means of a pinion.

In modern machine tools, the basic requirements of rotational speed, vibration value and accuracy are always increasing. The planetary transmission, which is a part of the machine tool transmission, is therefore a potential source of vibration that when the rotational speed increases can negatively influence the working surface.

The causes for vibration is based, among other things, on the unbalancing of the planetary transmission. The coupling parts such as the sliding collar require clearance so that they can move. The clearance in turn leads to an nonconcentric rotation, which generates unbalancing. For example, a sliding collar with the common weight of 1.6 kg can only move 0.1 mm from the center position, therefore the resulting unbalance is equal to 160 g-mm, which generates an extreme vibration. A planetary transmission operating under high rotational speed (i=1:1) demands a detailed processing of the work piece surface, which can only be achieved with low vibration machine tools.

SUMMARY OF THE INVENTION

The purpose of the present invention is to create a planetary transmission to process work pieces at high rotational speeds under little or no vibration.

The invention emanates from a planetary transmission, in particular from a two-stage planetary transmission for machine tools with a drive shaft which is connected to a sun gear, with an output shaft which is connected to the planetary carrier, with an internal gear that in the first operating position can engage with the housing and in the second operating position engages with the sun gear, with a hub that concentrically surrounds the drive shaft, and with a sliding collar which concentrically surrounds the hub and that remains in contact with the hub in one of the two operating positions.

According to the invention, it is foreseen that the sliding collar is placed concentrically over the hub axle's center bore in the turned-away side of the interior gear, which is placed in the engaged position of the sliding collar with the hub, concentric with the hub's axle and over its centering collar.

This so-called "captive" sliding collar, which in the first operating position is placed over the hub's centering collar, exhibits the benefit that the sliding collar in this operating position has significantly smaller play between the hub and the sliding collar than in common planetary transmissions, which merely exists from the play between the centering bore and the centering collar. The present function namely produces a positive fit connection between the sliding collar and the hub.

In a further embodiment of the invention, the sliding collar bearing will be fixed in the axial direction with a shrunken holding ring. This offers the advantage that no additional unbalancing is produced.

In a further embodiment of the invention, the sliding collar first of all comes in contact with the hub centering collar by approaching the centering bore, transverse to the displacement direction of the running edge of the centering bore provided with a chamfer. The centering collar it can also first of all come in contact with the centering bore by this approach, transverse to the displacement direction of the running edge of the centering bore provided with a chamfer.

This offers the additional benefit that also with a small disalignment of the sliding collar to the hub, the centering bore can run with no problems from the centering collar.

BRIEF DESCRIPTION OF THE DRAWINGS

The invention can be explained in more detail with the following drawings, in which beneficial application examples of planetary transmissions designed according to the invention are represented.

The only FIGURE is a partial section of a planetary transmission, which is built as a two-stage planetary transmission and is intended for deployment in a machine tool T.

DETAILED DESCRIPTION OF THE INVENTION

The planetary transmission shows a drive shaft 1 which is connected to a sun gear 2, as well as an output shaft 3 which is connected to a planetary carrier 10, whereby one of the planetary gears is identified with number 11. It further shows an internal gear 4, that in its first operating position engages with housing 12 of the planetary transmission, and in its second operating position engages with sun gear 2 aided by hub 6. Hub 6 concentrically surrounds drive shaft 1. The sliding collar is identified with number 5, which actuates the switch between both operating positions. Sliding collar 5 is thereby axially and movably mounted in bearings over internal gear 4.

In the upper half of the single FIGURE, the sliding collar 5 is shown engaged with the braking disc 14, whereby this operating position corresponds to the i>1 transformation of the two-stage planetary transmission.

According to the invention, the sliding collar 5 is intended to be placed in the loose side of internal gear 4 with a centering bore 7 concentrically located over hub 6, as is depicted in the lower half of FIG. 1, where i=1 in the engagement position, sliding collar 5 is engaged with hub 6 concentrically over the axle of hub 6 and is placed over the designed centering collar 8.

Beneficially, centering bore 7 first of all comes in contact with the centering collar 8 when it approaches the lying edge of the beveled centering bore, diagonally to the displacement direction. In a likewise beneficial way, it is intended that centering bore 7 approaches the centering collar 8, which first of all comes in contact diagonally to the displacement direction of the running edge of the centering collar with a bevel, so that it is possible to have a trouble-free displacement of the centering bore with the centering collar, with a minor disalignment between the centering bore 7 and centering collar 8.

The existing play surrounding and resting between centering collar 8 and centering bore 7, as it has been already mentioned, is significantly smaller than the existing play between the sliding collar and the internal gear teeth of common planetary transmissions.

On the upper section of centering bore 7 there is a specially shrunk holding ring 9 intended for the sliding collar bearings 13. This axially fixed holding ring 9 is intended to have as little additional unbalancing as possible.

Let it also be emphasized that a centering between the sliding collar 5 and hub 6 is not necessary for the operating position (i>1) represented above in the FIGURE, as in this operating position the sliding collar 5 stays and engages with the brakes or the braking disc 14.

The design of a centering bore at the end of the sliding collar interacting with a hub, as well as a centering collar shrunk in the hub, does not apply only to planetary transmissions for machine tools, but it is also applicable in all similar transmissions in which the sliding collars engage with a hub or with another connecting element, for example in automobile transmissions, whereby smoothness will also be increased and the idle running noise in the transmission is significantly reduced.

REFERENCE SIGNS

1 Drive shaft
2 Sun gear
3 Output shaft
4 Interior gear
5 Sliding collar
6 Hub
7 Centering diameter
8 Centering collar
9 Holding ring
10 Planetary carrier
11 Planetary gear
12 Housing
13 Sliding collar bearings
14 Braking disc
T Machine Tool

The invention claimed is:

1. A machine tool planetary transmission, the planetary transmission comprising:
   a drive shaft (1) connected to a sun gear (2);
   an output shaft (3) connected to a planetary carrier (10);
   an internal gear (4) which, in a first operating position, being coupled to a housing and, in a second operating position, being coupled to the sun gear;
   a hub (6) concentrically surrounding the drive shaft (1);
   a sliding collar (5) concentrically surrounding the hub (6) and being axially movable over and with respect to the internal gear (4);
      in the first operating position, the sliding collar (5) couples the internal gear (4) to the housing (12), and, in a second operating position, the sliding collar (5) couples the internal gear (4) to the hub (6),
      wherein an end of the sliding collar (5), remote from the internal gear (4), has an integral centering bore (7) which is concentric with the hub (6),
      the hub (6) includes a centering collar (8) which is concentric with an axis of the hub (6) and located along the axis of the hub (6) so that the centering bore (7) of the sliding collar (5) concentrically surrounds and engages with the centering collar (8) when a locking arrangement of the sliding collar (5) engages with a mating locking arrangement of the hub (6) in the second operating position, and
      a largest diameter portion of the hub (6) includes the centering collar (8), an external tooth locking arrangement is located adjacent the centering collar (8), and the sliding collar (5) engages, upon movement of the sliding collar (5) to the second position, both the external tooth locking arrangement and the centering collar (8).

2. The machine tool planetary transmission according to claim 1, wherein the centering bore (7) first comes into contact with the centering collar (8) by approaching the centering collar (8), axially in a displacement direction of the centering bore (7), with a beveled running edge of the centering bore (7).

3. The machine tool planetary transmission according to claim 1, wherein the centering collar (8) first comes into contact with the centering bore (7) by approaching the centering bore (7), axially in a displacement direction of the centering bore (7), with the beveled running edge of the centering collar (8).

4. The machine tool planetary transmission according to claim 1, wherein a diameter of the centering bore (7) is larger than a largest diameter portion of the hub (6) so that the centering bore (7) completely surrounds the largest diameter portion of the hub (6) when the sliding collar (5) is in the second operating position.

5. A planetary gear incorporated into a machine tool, the planetary gear comprising:
   an input shaft (1) being connected to a sun gear (2);
   an output shaft (3) being connected to a planet carrier (10); and
   an internal gear (4) being connectable, in a first shifting position, with a housing (12) of the machine tool, and, in a second shifting position, with the sun gear (2);
   a hub (6) concentrically surrounding the input shaft (1);

a sliding sleeve (5) concentrically surrounding the hub (6) and being movable along and over the hub (6) to the second shifting position to positively engage with the hub (6) with the sliding sleeve (5);

wherein the sliding sleeve (5) is provided with a centering section (7), on an end thereof remote from the internal gear (4), featuring a centering diameter (7') which is concentrically arranged with the hub (6), and this centering section (7) is formed unitary with the sliding sleeve (5);

the hub (6) has a centering collar (8) arranged concentrically with an axis of the hub (6), and during positive engagement of the sliding sleeve (5) with the hub (6), the centering section (7) surrounds and abuts against the centering collar (8), and a largest diameter portion of the hub (6) includes the centering collar (8), an external tooth arrangement is located adjacent the centering collar (8), and the sliding collar (5) engages, upon movement of the sliding collar (5) to the second position, both the external tooth arrangement and the centering collar (8).

6. The planetary gear incorporated into a machine tool according to claim 5, wherein a leading edge of the centering section is provided with a bevel, extending transverse to a displacement direction of the centering section, and the bevel first contacts the centering collar (8) as the centering section (7) approaches and engages the centering collar (8).

7. The planetary gear incorporated into a machine tool according to claim 5, wherein a leading edge of the centering collar (8) is provided with a bevel, extending transverse to a displacement direction of the centering section, and the bevel first contacts the centering section (7) as the centering section (7) approaches and engages the centering collar (8).

8. The machine tool planetary transmission according to claim 5, wherein a diameter of the centering bore (7) is larger than a largest diameter portion of the hub (6) so that the centering bore (7) completely surrounds the largest diameter portion of the hub (6) when the sliding collar (5) is in the second operating position.

9. A machine tool planetary transmission which is shiftable between first and second operating positions only when a drive shaft (1) is stationary, the planetary transmission comprising:

the drive shaft (1) being connected to a sun gear (2);

an output shaft (3) being connected to a planetary carrier (10);

an internal gear (4) which, in the first operating position, being coupled to a housing and, in the second operating position, being coupled to the sun gear;

a hub (6) concentrically surrounding the drive shaft (1);

a sliding collar (5) concentrically surrounding the hub (6) and being axially movable over and with respect to the internal gear (4), in the first operating position, the sliding collar (5) coupling the internal gear (4) to the housing (12), and, in a second operating position, the sliding collar (5) coupling the internal gear (4) to the hub (6);

wherein an end of the sliding collar (5), remote from the internal gear (4), has an integral centering bore (7) which is concentric with the hub (6), the hub (6) includes a centering collar (8) concentric with an axis of the hub (6) and located along the axis of the hub (6) so that, when the sliding collar (5) is moved to the second operating position and surrounds and engages with the hub (6), the centering bore (7) of the sliding collar (5) concentrically surrounds and engages with the centering collar (8); and an external tooth arrangement is located adjacent the centering collar (8) on a largest diameter section of the hub (6) and, upon movement of the sliding collar (5) to the second position, both the external tooth arrangement and the centering collar (8) engage with the sliding collar (5) to facilitate transmission of drive to the internal gear (4).

* * * * *